United States Patent
Yen et al.

(10) Patent No.: US 10,972,834 B1
(45) Date of Patent: Apr. 6, 2021

(54) VOICE DETECTION USING EAR-BASED DEVICES

(71) Applicant: Amazon Technologies, Inc., Seattle, WA (US)

(72) Inventors: Kuan-Chieh Yen, Foster City, CA (US); Daniel Wayne Harris, San Francisco, CA (US); Carlo Murgia, Santa Clara, CA (US); Taro Kimura, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/787,580

(22) Filed: Feb. 11, 2020

Related U.S. Application Data

(60) Provisional application No. 62/926,918, filed on Oct. 28, 2019.

(51) Int. Cl.
*H04R 3/00* (2006.01)
*H04R 1/10* (2006.01)

(52) U.S. Cl.
CPC ............. *H04R 3/00* (2013.01); *H04R 1/1016* (2013.01); *H04R 2201/107* (2013.01)

(58) Field of Classification Search
CPC ... H04R 3/00; H04R 1/1016; H04R 2201/107
See application file for complete search history.

(56) References Cited

U.S. PATENT DOCUMENTS

2019/0146747 A1* 5/2019 Usher ................... G10L 15/22
704/233

* cited by examiner

*Primary Examiner* — Andrew L Sniezek
(74) *Attorney, Agent, or Firm* — Lee & Hayes, P.C.

(57) ABSTRACT

This disclosure describes techniques for detecting voice commands from a user of an ear-based device. The ear-based device may include an in-ear facing microphone to capture sound emitted in an ear of the user, and an exterior facing microphone to capture sound emitted in an exterior environment of the user. The in-ear microphone may generate an inner audio signal representing the sound emitted in the ear, and the exterior microphone may generate an outer audio signal representing sound from the exterior environment. The ear-based device may compute a ratio of a power of the inner audio signal to the outer audio signal and may compare this ratio to a threshold. If the ratio is larger than the threshold, the ear-based device may detect the voice of the user. Further, the ear-based device may set a value of the threshold based on a level of acoustic seal of the ear-based device.

20 Claims, 9 Drawing Sheets

VOICE DETECTION USING EAR-BASED DEVICES

RELATED APPLICATIONS

This application claims priority to U.S. Provisional Patent Application No. 62/926,918, filed on Oct. 28, 2019, the entire contents of which are incorporated herein by reference.

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands. In some instances, however, these computing devices need to detect respective users voices from ambient noise before identifying and responding to any such voice commands.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
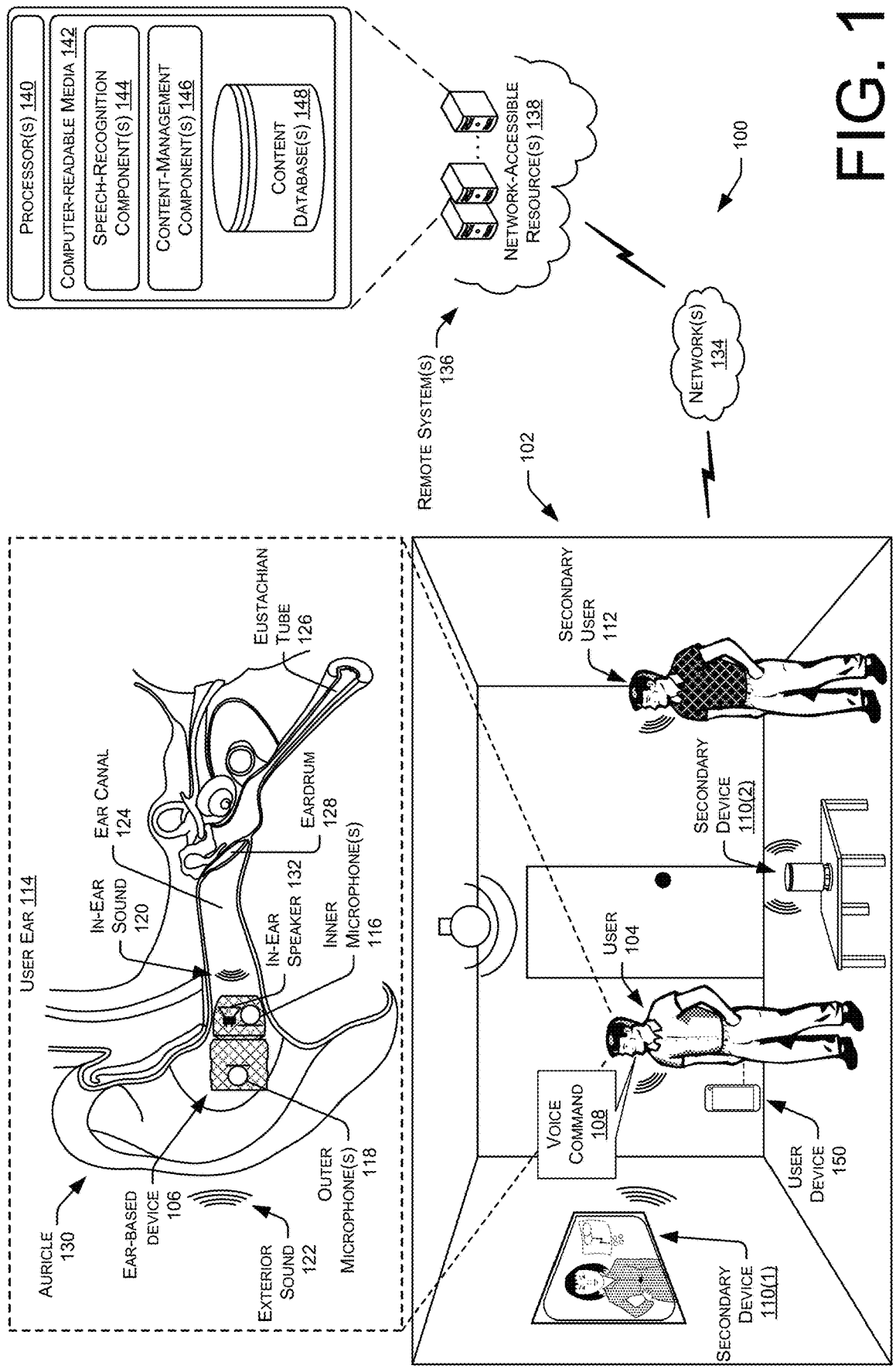
FIG. 1 illustrates a schematic diagram of an illustrative environment in which a user is wearing a voice-controlled, ear-based device that detects a voice command from the user. The ear-based device may determine that sound captured by microphones of the ear-based device was a voice command of the user of the ear-based device, as opposed to other sources of sound in the environment. In some instances, the ear-based device may include an inner microphone and at least one outer microphone and the ear-based device may take into account a level of acoustic isolation between these microphones when determining whether the audio signals include the voice of the user.

Due to the usefulness of controlling computing devices using voice commands, the types of computing devices that are becoming controllable using voice commands continues to proliferate. In order to identify and respond to these voice commands, however, these devices may need to first detect a voice of a user. In some instances, such a device may attempt to detect the voice of a particular user, such as a user closest to or operating a device, while disregarding background noise, which may include the voices of one or more other users.

In some instances, described below, an ear-based, wearable computing device (or "ear-based device") is configured to detect, from sound in an environment of the ear-based device, a voice of a user wearing the ear-based device. The ear-based device may comprise a wired or wireless earbud that fits in a user's ear, an ear-muff device that at least partially covers the ear of the user, or any other type of ear-based computing device that is worn on, or near, an ear of the user. The techniques described herein may determine, prior to performing various voice-processing techniques, that sound captured by microphones of the ear-based device corresponds to a voice command of a user of the ear-based device, as opposed to background noise or voice commands of other people in an environment of the ear-based device.

After detecting the voice of the user, the ear-based device or one or more other devices may perform various voice-processing techniques to identify one or more voice commands of the user. For example, upon detecting the voice of the user, the ear-based device may analyze one or more audio signals generated by the ear-based device to determine whether the audio signal(s) include a predefined utterance (e.g., a wakeword). If so, the ear-based device may begin analyzing the audio signal(s) to identify a voice command of the user or may begin sending the audio signal(s) to one or more other computing devices for attempting to identify the voice command. For example, users of ear-based devices may enable users to perform daily actives, such as conducting a phone call, listening to music, and so forth.

By analyzing the audio signal(s) to detect the voice of the user wearing the ear-based device prior to performing speech-recognition on the audio signal(s), the ear-based device conserves energy of a power supply (e.g., a battery) of the ear-based device. Further, and as described in detail below, the ear-based device is configured to detect the voice of the user wearing the microphone while otherwise disregarding ambient noise, such as other users in the environment of the user wearing the microphone or other ambient noises.

The ear-based devices described below may each include one or more inner microphones, positioned within and facing an ear canal of the user when the user wears the ear-based device to capture sound emitted from the ear canal of the user. In addition, the ear-based device may include one or more outer microphones, positioned outside of the ear canal when the user wears the ear-based device, that capture sound from an environment of the user that is exterior the ear of the user. For example, in one instance the ear-based device includes one inner microphone and two outer microphones. The inner microphone may generate an audio signal representing sound emitted largely through the ear canal when the user speaks, while each of outer microphones generate respective audio signals representing sound from the exterior environment of the ear of the user.

In some examples, the ear-based device may utilize acoustic isolation between the inner microphone and the outer microphones to prevent the microphones from capturing primarily the same sound waves. For instance, the ear-based device may include passive acoustic isolation between the microphones (e.g., acoustic blocking material, such as foam or plastic, to fill the ear canal of the user, headphones which encapsulate entire ear, etc.), and/or active acoustic isolation (e.g., emitting a noise-canceling waveform from a microphone of the ear-based device to cancel out noise) to ensure that the inner microphone and outer microphones do not capture primarily the same sound. In this way, the inner microphone generates an inner audio signal that represents sound transmitted through the ear canal of the user from other portions of the ear, such as the Eustachian tube, the eardrum, bone, tissue, and so forth. Similarly, each outer microphone may, using acoustic isolation, generates a respective outer audio signal that represents sound from the environment exterior the ear of the user. By acoustically isolating the inner microphone from the outer microphones, the inner audio signal may represent sounds that were emitted by the user, such as a voice command, cough, clearing of throat, or other user noises. Similarly, each outer audio signal will represent sounds from the environment exterior the ear of the user, such as ambient noise, other people speaking, and noises emitted by the user of the ear-based device that are loud enough to be detected by the exterior microphone. Given the above, it is to be appreciated that a level of acoustic isolation, as described herein, may be indicative of the amount of separation between the sound captured by an inner microphone of an ear-based device and the sound captured by an outer microphone of the ear-based device. Stated otherwise, a high level of acoustic isolation between two microphones results in a relatively high differentiation between the sound waves captured by the first microphone and the sound waves captured by the second microphone.

In some instances, the ear-based device may use characteristics of one or more of these audio signals to determine whether a user wearing the ear-based device is speaking. For example, the ear-based device may determine a first energy value of the inner audio signal, such as a power of the inner audio signal, and may compare this first energy value to a first threshold. Additionally, or alternatively, the ear-based device may determine a second energy value of one of the outer audio signals and may compare this second energy value to a second threshold. In addition, or in the alternative, the ear-based device may determine a ratio of the first energy value to the second energy value (or to a third energy value of the other of the two outer audio signals) and may compare this ratio to a third threshold. In some instances, the ear-based device may detect the voice of the user wearing the ear-based device if one or more of these measurement values is greater than the respective threshold. For example, the ear-based device may detect the voice of the user, and output a corresponding indication, in response to determining that the first energy value is greater than the first threshold, the second energy value is greater than the second threshold, and the ratio is greater than the third threshold.

That is, the ear-based device may be configured to output an indication that the voice of the user wearing the ear-based device has been detected if the inner audio signal has a threshold amount of energy, the outer audio signal has a threshold amount of energy, and an energy ratio between the inner audio signal to one of the outer audio signals is greater than a threshold (given that the voice of the user has a greater presence in the inner audio signal than the outer audio signal, while the opposite may be true for ambient noise). After detecting the presence of the voice of the user, the ear-based device may perform further processing on one or more of the audio signals, such as beamforming, speech recognition, or sending the audio signals to one or more other devices.

While the above examples describe generating respective audio signals by inner and/or outer microphones of the ear-based device, in other examples the ear-based device may additionally, or alternatively, include one or more other sensors for generating audio signals for determining whether a user wearing the device is speaking. For example, the ear-based device may include a first inner accelerometer configured to generate an inner audio signal based on captured vibrations in the ear canal and a second outer accelerometer configured to generate an outer audio signal based on vibrations from the environment of the user. Of course, while this example describes a single inner accelerometer and a single outer accelerometer, the number of accelerometers may vary, as described herein for inner and outer microphones. Regardless of the number, the respective audio signals generated by the accelerometers may be processed in the same or similar manners as described herein for audio signals generated by the inner and outer microphones for determining whether voice is present in one or more audio signals, as described in detail below.

Furthermore, in some instances the ear-based device may include an in-ear speaker that may output content into an ear canal of the user. This content may, in some instances, affect the energy value associated with the inner audio signal and, thus, may be taken into account prior to the ear-based device performing the techniques for determining whether the audio signal(s) include the voice of the user. In some instances, the speaker may output audio content corresponding to music, a podcast, a telephone call, or the like. In addition, or in the alternative, the speaker may output "pass-through" audio content—or content that is based on an audio signal generated by an outer microphone that captures sound in the environment of the user. That is, the pass-through audio content may inject, into the speaker and, thus, to the ear canal of the user, noise from the environment of the user for replicating what the user would hear if he or she were not wearing the ear-based device. In still other instances, the speaker may output, additionally or alternatively, audio content based on active noise control. That is, the ear-based device may attempt to reduce the amount of the user's own voice that the user "hears" in the space of the ear canal of the user by introducing, to the speaker, active noise control (ANC) audio content intended to cancel out the sound of the user's own voice. Thus, the speaker may output, in some instances, primary content (e.g., music, telephone call audio, etc.) and secondary content (e.g., pass-through audio content, ANC audio content, etc.).

In some instances, however, the presence of some or all of the primary and secondary audio content may distort the calculation of the energy value of the inner audio signal due to the voice of the user and, thus, to the calculation of the ratio between the energy of the inner audio signal to the outer audio signal as well. Given this, the ear-based device may attempt to remove the influence of this audio content being output by the speaker of the ear-based device prior to calculating the energy value of the inner audio signal for the purpose of determining whether the energy of this signal is greater than a threshold and whether the ratio based on this measurement is greater than a ratio threshold. Stated otherwise, prior to determining whether a user's voice is detected within the inner audio signal and/or the outer audio signal, the ear-based device may attempt to remove, to a greatest extent possible, the presence of other potential audio content (primary and secondary) to isolate the sound from the voice of the user.

In addition, in some instances a level of a seal of the ear-based device may affect the energy value of the inner audio signal. That is, if the ear-based device is inserted into the ear of user securely, thus creating a seal between the ear canal of the user and the environment of the user, then sound introduced to the ear canal based on the voice of the user may generally remain in the ear canal and an energy value of the inner audio signal may be relatively high. If, however, this seal is poor, then sound introduced to the ear canal based on the voice of the user may effectively "escape" the ear canal, resulting in a relatively a relatively low energy value of the inner audio signal.

Thus, the ear-based device described herein may also take into account a quality of a seal of the ear-based device (i.e., a sealing condition) when determining whether audio signals include the voice of the user. For example, the ear-based device may change energy thresholds based on a current sealing condition of the ear-based device. For instance, if the ear-based device determines that there is currently a relatively good seal, then the ear-based device may utilize a relatively high threshold for determining whether the inner audio includes adequate energy to be said to represent the voice of the user and a relatively high threshold for comparison with the ratio described above. That is, given that the a relatively good seal may result in a higher energy value of the inner audio signal (given that the sound is effectively "trapped"), the ear-based device may utilize relatively high thresholds. Conversely, if the ear-based device determines that there is currently a relatively poor seal, then the ear-based device may utilize a relatively low threshold for determining whether the inner audio includes adequate energy to be said to represent the voice of the user and a relatively low threshold for comparison with the ratio described above. That is, given that the a relatively poor seal may result in a lower energy value of the inner audio signal (given that the sound "escapes" into the environment), the ear-based device may utilize relatively low thresholds.

In some instances, the ear-based device may determine a current sealing condition based at least in part on a measure of acoustic isolation between the inner microphone and the outer microphone(s). That is, given that a good seal will result in good acoustic isolation between the ear canal of the user and the ambient environment of the user, and a poor seal will result in poor acoustic isolation, the ear-based device may determine a level of acoustic isolation and use this level of acoustic isolation as a measure or indication of a level of seal of the ear-based device in the ear of the user. Further, in some instances the ear-based device may determine a level of acoustic isolation between the inner microphone and the outer microphones based on one or more filter coefficients determined by an adaptive filter circuit as part of an acoustic echo cancelation (AEC) process, as described below. As used herein, a level of acoustic isolation may represent a particular normalized value, such as a value ranging between zero (0) (representing no acoustic isolation) and one (1) representing complete acoustic isolation. As described below, the value of the acoustic isolation may be based on the filter coefficients determined using one or more adaptive filter circuits. In some instances, a data store may be pre-populated with a mapping between different filter coefficients and different levels of acoustic seal, such that an ear-based device may determine a level of acoustic seal based on filter coefficients determined while a user wears and operates the ear-based device. Further, while the above example describes utilizing normalized values, in other instances a level of acoustic isolation may be one of a predefined number of categories. For instance, a first set of filter coefficients may be associated with a first level of acoustic isolation, a second set of filter coefficients may be associated with a second level of acoustic isolation, and so forth, with each respective level of acoustic isolation representing greater (or lesser) isolation than the preceding level. Again, in these instances a data store may be pre-populated with respective sets or ranges of filter coefficients mapped to respective levels of acoustic isolation such that the ear-based device may determine a level of acoustic seal based on filter coefficients determined while a user wears and operates the ear-based device.

Thus, and as described below, this disclosure describes ear-based devices configured to detect presence of a voice of a user wearing the ear-based device, such that the ear-based device may perform further processing of the audio signals upon the detection (and not prior). In order to detect the voice of the user, the ear-based device may compare one or more energy values, based on an energy value of an inner audio signal and/or an outer audio signal, to one or more thresholds. However, given that a level of seal of the ear-based device may affect these energy values (e.g., an energy value of the inner audio signal and a ratio of the inner audio signal to an outer audio signal), the ear-based device may estimate a current sealing condition of the device and take this into account when setting one or more of the thresholds for detecting the voice of the user. Further, given that the sealing condition may correlate to a level of acoustic isolation between the inner microphone and an outer microphone of the device, the ear-based device may perform techniques for determining a level of acoustic isolation, which in turn may be used to determine a sealing condition of the ear-based device, which in turn may be used to set one or more of the thresholds.

Further, it is noted that, in some examples, the techniques described herein may reduce the amount of power consumed by voice-enabled, ear-based devices. For example, by determining that the inner audio signal and the outer audio signal(s) each represent a voice command of a user, as opposed to other noises from the user and/or ambient sounds from the environment of the user, the additional voice-processing techniques in the audio pipeline of the ear-based device are only performed when an actual voice command from the user of the ear-based device is detected. The additional voice-processing techniques may use additional power to perform, and by detecting a voice command of the user of the ear-based device prior to performing these techniques, battery life of the ear-based device may be conserved. Further, the techniques described herein may improve the functioning of the ear-based devices in other ways. Often, voice-enabled devices are in a lower power mode until a wake word is detected, and subsequent to detecting the wake word, the audio data may begin to be processed and/or transmitted to other devices for processing. With the proliferation of voice-enabled devices, other people in the environment of the user of the ear-based device may also attempt to control another voice-enabled device using a voice command that the ear-based device detects. Using previous techniques, the ear-based device may detect the voice command of the other person and begin processing the voice command if the wake word is detected. This may result in the ear-based device performing undesirable actions, such as changing a song based on another person's voice command. However, utilizing the techniques described herein, voice commands from the environment of the user of the ear-based device will be determined as not being issued by the actual user of the ear-based device, and will not be processed further by the ear-based device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment 102 in which a user 104 is wearing a voice-controlled, ear-based device 106 that detects a voice command 108 from the user 104. The ear-based device 106 may determine that sound captured by microphones of the ear-based device 106 was the voice command 108 of the user 104 of the ear-based device 106, as opposed to other sources of sound in the environment 102.

As illustrated, the environment 102 may not only include the user 104 but may further include other potential sources of sound. For example, multiple secondary devices 110 may be outputting sound, such as a secondary device 110(1) of a television may be outputting sound for a television show, a secondary device 110(2) of a portable audio input/output device may be outputting music, a secondary user 112 may be issuing an additional voice command to control operations of the secondary device 110(2), and so forth. In such examples, the ear-based device 106 may be a voice-enabled device to determine what sound in the environment 102 is a voice command 108 to be processed to determine a command issued by the user 104 of the ear-based device 106. Traditionally, multiple sources of sound may result in a voice-controlled device to continuously attempt to process the different sound emitted by the different sources in order to identify a voice command of the user 104. As described above, processing audio signals using voice-processing techniques may be a power-intensive process. While additional processing of audio signals may not be burdensome for user devices that are powered by a mains-power source, battery-powered devices may experience undesirable reductions in battery life. In some examples, the voice-enabled, ear-based device 106 may include audio-signal-processing techniques that occur upon detection of a wake word in the voice command 108 of the user 104. However, the pre-processing techniques used on audio signals representing the voice command 108 to detect the wake word may use a relatively large amount of power and may cause undesirable reduction in battery life of the ear-based device 106 if continuously being performed upon detecting sound.

As illustrated in FIG. 1, the ear-based device 106 may be positioned in an ear 114 of the user 104. The ear-based device 106 may include one or more inner microphones 116 and one or more outer microphones 118, wherein each inner microphone 116 captures in-ear sound 120, and each outer microphone 118 captures exterior sound 122. The inner microphone 116 may be positioned in the ear-based device 106 such that, when the ear-based device 106 is worn in the user's ear 114, the in-ear microphone captures the in-ear sound 120 emitted from an ear canal 124 of the user ear 114. The in-ear sound 120 may be sound that was emitted by the user 104 and has traveled through the inner portions of the ear 114, such as through the eustachian tube 126, an eardrum 128, the ear canal 124, and/or other bone and tissue of the ear 114. Each outer microphone 118 may be positioned in the ear-based device 106 such that, when the ear-based device 106 is worn in the user's ear 114, the outer microphone 118 captures the exterior sound 122 and generates an outer audio signal. In some examples, the exterior sound 122 may be captured by each outer microphone 118 and have a frequency response caused by the auricle 130 of the user's ear 114 (e.g., a head-related transfer function (HRTF) response). The ear-based device may have passive and/or active acoustic isolation such that the inner microphone 116 captures little, or no, exterior sound 122, and the outer microphone 118 may detect little, or no, in-ear sound 120. In various examples, the ear-based device 106 may further include an in-ear speaker 132 that outputs audio data, such as streaming music audio data or telephone call audio data, into the ear canal 124 towards the eardrum 128 of the user 104.

Furthermore, in addition to this primary content, the in-ear speaker 132 may also output secondary content. This secondary content may comprise "pass-through" content and/or "active-noise-control" content. The pass-through content maybe based on an audio signal generated by one or more of the outer microphones 118 that captures the exterior sound 122 in the environment of the user. That is, the pass-through audio content may inject, into the speaker 132 and, thus, to the ear canal 124 of the user, noise from the environment of the user 104 for replicating what the user would hear if he or she were not wearing the ear-based device 106. In still other instances, the speaker may output, additionally or alternatively, audio content based on ANC. That is, the ear-based device 106 may attempt to reduce the amount of the user's own voice that the user 104 "hears" in the space of the ear canal 124 by introducing, to the speaker 132, ANC audio content intended to cancel out the sound of the user's own voice. Thus, the speaker 132 may output, in some instances, primary content (e.g., music, telephone call audio, etc.) and secondary content (e.g., pass-through audio content, ANC audio content, etc.).

Thus, the ear-based device 106 may include one or more inner microphones 116 to generate inner audio signals representing the in-ear sound 120, and may further include one or more outer microphones 118 to generate outer audio signals representing the exterior sound 122. As described in more detail below with respect to FIGS. 2-6, components of the ear-based device may perform voice-activity detection (VAD) techniques on the inner audio signal, the exterior audio signal, or portions of one or both of the signals to determine whether the inner and/or outer audio signals include the voice of the user 104 (as opposed to other background noise, such as the voice of the secondary user 112). In examples where the components detect a voice command 108, the components may proceed to perform further acoustic-processing techniques for voice-processing (e.g., beamforming, keyword spotting, etc.). However, if the components determine using the VAD techniques that the audio signal(s) represents sound other than speech (e.g., a cough, clearing throat, etc.), the components of the ear-based device 106 may refrain from performing further voice-processing techniques.

The ear-based device 106 may include components that enable the device 106 to perform various operations based on the voice commands 108, such as streaming audio data (e.g., music) and outputting the audio data using the in-ear speaker 132, performing a telephone call, and so forth. In some examples, the ear-based device 106 may be a sophisticated voice-enabled device 106 and include components for processing the voice command 108 to determine an intent of the voice command 108 of the user 104, and further determining an operation that the ear-based device 106 is to perform based on the intent of the voice command of the user 104. However, the ear-based device 106 may, in some examples, have less functionality and may simply perform some types of pre-processing on audio data representing the voice commands 108 of the user 104. For instance, the ear-based device 106 may merely serve as an interface or "middle man" between a remote system, or server, and the user 104. In this way, the more intensive processing used for speech processing may be performed using large amounts of resources of remote services.

Accordingly, the ear-based device 106 may include network interfaces which configure the ear-based device 106 to communicate over one or more networks 134 to send and receive data with various computing devices, such as one or more remote systems 136 which may include various network-accessible resources 138. In some examples, the remote system(s) 136 may be a speech processing system (e.g., "cloud-based system," "software as a service (SaaS)," "network-accessible system," etc.) which receives audio data from the ear-based device 106 representing a voice command 108 of the user 104. For instance, the ear-based device 106 may receive a "wake" trigger (e.g., wake word) which indicates to the ear-based device 106 that the user 104 is speaking a voice command 108, and the ear-based device 106 may begin streaming, via a network interface and over the network(s) 134, audio data representing the voice command 108 as captured by the microphones of the ear-based device 106 to the remote system(s) 136. However, in some examples, the ear-based device 106 may be unable to, or refrain from doing so to conserve power, communicate over certain network(s) 134 (e.g., wide-area networks). In such examples, the ear-based device 106 may be communicatively coupled to a user device 150 in the environment 102 of the user 104. The ear-based device 106 may communicate audio data representing the voice command 108 to the user device 150 using the network interfaces and over another network (e.g., Bluetooth, WiFi, etc.). The user device 150 may be configured to, in turn, transmit the audio data representing the voice command 108 to the remote system(s) 136 over the network(s) 134.

The network(s) 134 which connect the ear-based device 106 to the remote system(s) 136 may represent an array or wired networks, wireless networks (e.g., WiFi), or combinations thereof. The remote system(s) 136 may generally refer to a network-accessible system—or "cloud-based system"—implemented as a computing infrastructure of processors, storage, software, data access, and so forth that is maintained and accessible via the network(s) 134, such as the Internet. Cloud-based systems may not require end-user knowledge of the physical location and configuration of the system that delivers the services. As illustrated, the remote system(s) 136 may comprise the network-accessible resource(s) 138, such as servers. Multiple of such resources 138 may be included in the system(s) 136. For instance, the network-accessible resource(s) 138 may include one or more processors 140, which may include a central processing unit (CPU) for processing data and computer-readable instructions, and computer-readable storage media 142 storing the computer-readable instructions that are executable on the processor(s) 140. The computer-readable media 142 may individually include volatile random access memory (RAM), non-volatile read only memory (ROM), non-volatile magnetoresistive (MRAM) and/or other types of memory, and may store one or more speech-recognition component(s) 144, such as an automatic speech-recognition (ASR) component or system and a natural-language-understanding (NLU) component or system.

In some examples, the ASR component or system of the speech-recognition component(s) 144 may receive audio data from the user device 150 that represents a voice command 108 and begin performing ASR on the audio data to generate text data that represents words of the voice command 108. Further, the NLU component or system of the speech-recognition component(s) 144 may then use NLU to identify one or more user voice commands 108, and intents of those voice commands 108, from the generated text data. Finally, the speech-recognition component(s) 144 may determine an instruction or command to perform, or for the ear-based device 106 to perform, based on the intent of the voice commands. For instance, the speech-recognition component(s) 144 may determine that the user 104 is requesting that the ear-based device 106 stream music, control a secondary device (e.g., turn on a TV, conduct a phone call using a cell phone, etc.), perform a phone call using the user device 150, and so forth. The speech-recognition component(s) 144 may then cause the remote system(s) 136 to relay the command or instruction to the ear-based device 106 and/or the user device 150.

In some examples, the computer-readable media 142 may further store one or more content-management components 146 that are configured to manage content stored in one or more content databases 148. The content-management component(s) 146 and the content database(s) 148 may be stored at a single location, or across different locations and in different arrangements of computing devices of the network-accessible resource(s) 138. In some examples, the content-management component(s) 146 may be associated with a same operator of the speech-recognition component(s) 144 and manage or obtain content from the content database(s) 148 based on commands determined by the speech-recognition component(s) 132. For instance, the speech-recognition component(s) 144 may determine that a voice command 108 of the user 104 detected by the ear-based device 106 is a request to stream music that is stored in the content database(s) 148. The content-management component(s) 146 may receive an indication of that request, and an indication of the music, and cause the ear-based device 106 to stream music from the content database(s) 148. For instance, the content-management component(s) 146 may be executable by the processor(s) 140 to identify a storage location in the content databases(s) 148 where the desired music is stored. In some examples, this may comprise the content-management component(s) 146 requesting a third-party device or system of devices (e.g., Pandora, Spotify, etc.) for a universal resource location (URL) which indicates the location at which the music is stored that the ear-based device 106 is to stream. The content-management component(s) 146 then sends an indication of the URL to the ear-based device 106, which in turn accesses and begins streaming the audio data from the content database(s) 148 and outputs the audio data using the in-ear speaker 132 of the ear-based device 106. However, the content database(s) 148 may store any types of data and stream or otherwise send the data to the ear-based device 106.

In various examples, some of the techniques described herein may employ of the use of various types of algorithms, or transforms, to analyze the audio signals and audio data. For instance, analog to digital converters may be employed to generate or convert the audio signals and audio data from analog to digital. Further, various types of transforms may be employed. For instance, some of the techniques described herein may be used on the audio data while represented in the time domain, while some of the techniques may be used on the audio data represented in the frequency domain. As an example, to identify frequency components, audio data may be represented in the frequency domain using a transform, such as a Fourier Transform (e.g., Fast Fourier Transform, discrete Fourier Transforms, etc.), Hartley Transform, Fourier Series, Laplace transforms, Z transforms, etc. The audio signals may be split into frequency ranges, frequency bands, or frequency components, for various purposes. For instance, the frequency components/ranges may be used to identify the energy values for various frequency components or ranges, which may be used for comparison to determine whether there are correlations between the frequency bands or ranges.

Figure 2:
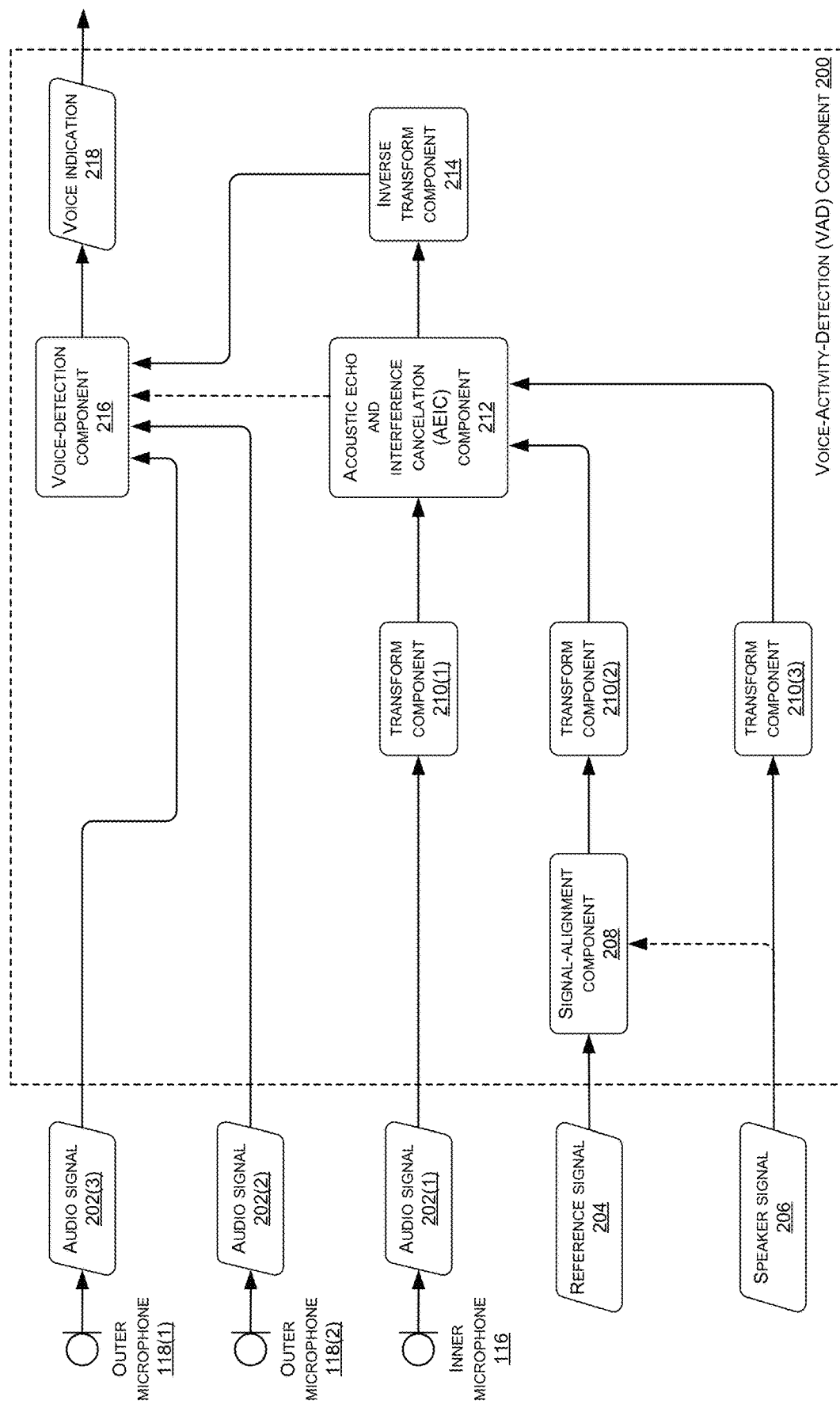
FIG. 2 illustrates example components of a voice-activity-detection (VAD) component that may reside on the ear-based device worn by the user. The VAD component may process and analyze audio signals generated by the ear-based device to detect the voice of the user.

FIG. 2 illustrates example components of a voice-activity-detection (VAD) component 200 that may reside on the ear-based device 106 worn by the user 104 of FIG. 1. The VAD component 200 may process and analyze audio signals generated by the ear-based device to detect the voice of the user.

As illustrated, in this example the ear-based device 106 includes an inner microphone 116 that generates a first audio signal 202(1) (based on in-ear sound), a first outer microphone 118(1) that generates a second audio signal 202(2) (based on exterior sound), and a second outer microphone 118(2) that generates a third audio signal 202(3) (based on exterior sound). In addition, FIG. 2 also illustrates that the in-ear device 106 may utilize a reference signal 204, which may correspond to primary content being sent to the speaker 132 of the ear-based device. For example, the reference signal 204 may correspond to a signal of a song being output by the speaker 132, a podcast being output, or the like. In addition, the ear-based device 106 may utilize a speaker signal 206, which represents the summation of audio content currently being sent to and output by the speaker 132. For example, the speaker signal 206 may include the reference signal 204 (or another copy of the reference signal), as well as audio signal(s) corresponding to secondary content, such as pass-through content and ANC content, described above. In sum, the speaker signal 206 may represent both first audio content (e.g., corresponding to content requested by the user, such as music) and second audio content (e.g., corresponding to additional content, such as a first component of the second audio content corresponding to pass-through content and a second component of the second audio content corresponding to ANC content).

As illustrated, the VAD component 200 may include a signal-alignment component 208 that receives the reference signal 204 and the speaker signal 206. The signal-alignment component 208 may attempt to align, in the time domain, the reference signal 204 to the speaker signal 206. For example, signal-alignment component 208 may utilize known alignment techniques that, for example, compare amplitudes of these two signals to determine how they correlate to one another in time.

After the reference signal 204 and the speaker signal 206 have been aligned, each of these audio signals may be transformed into the frequency domain using a respective transform component. For example, the reference signal 204 may be input to a transform component 210(2), which may use a Fourier Transform or the like to transform the reference signal 204 into the frequency domain. Similarly, the speaker signal 206 may be input to a transform component 210(3), which may use a Fourier Transform or the like to transform the speaker signal 206 into the frequency domain. In addition, the inner audio signal 202(1) may be input to a transform component 210(1), which may use a Fourier Transform or the like to transform the inner audio signal 202(1) into the frequency domain.

After each of the inner audio signal 202(1), the reference signal 204, and the speaker signal 206 have been transformed into the frequency domain, each of these signals may be input into an acoustic echo and interference cancelation (AEIC) component 212. As described in detail below with reference to FIG. 3, the AEIC component 212 may analyze and process these received signals to output an audio signal representative of the inner audio signal after removing portions of the inner audio signal based on the content being output by the speaker, such as the first (e.g., music) and second (e.g., pass-through and ANC content) described above. Stated otherwise, the AEIC component 212 may output an audio signal that isolates any in-ear sound from content output by the speaker such that the voice of the user (if present) may be more accurately detected. In addition, the AEIC component 212 may output one or more filter coefficients, which may be used to determine a level of seal of the ear-based device 106 in the user's ear, which in turn may be used to determine one or more criteria (e.g., threshold(s)) for detecting the voice of the user 104.

As illustrated, the AEIC component 212 may provide the processed inner audio signal to an inverse transform component 214, which may perform an inverse Fourier Transform or the like to transform this audio signal from the frequency domain into the time domain. The inverse transform component 214 may then provide this audio signal to a voice-detection component 216. As described in detail below with reference to FIG. 4, the voice-detection component 216 may receive this audio signal, along with the audio signals 202(2) and 202(3) generated respectively by the outer microphones to determine whether a voice of the user 104 is present. In addition, the AEIC component 212 may provide an indication of the one or more filter coefficients, which the voice-detection component 216 may also use to detect the presence of the voice of the user 104.

As illustrated, the voice-detection component 216 may output a voice indication 218 if the voice-detection component 216 detects the presence of the voice of the user 104. In some instances, the voice-detection component 216 outputs indication(s) of whether or not the audio signal(s) include the voice of the user 104. For example, the voice-detection component may output continuous or periodic indications, such as indications of zero (0) if a voice is not detected an indications of one (1) if the voice is detected.

Figure 3:
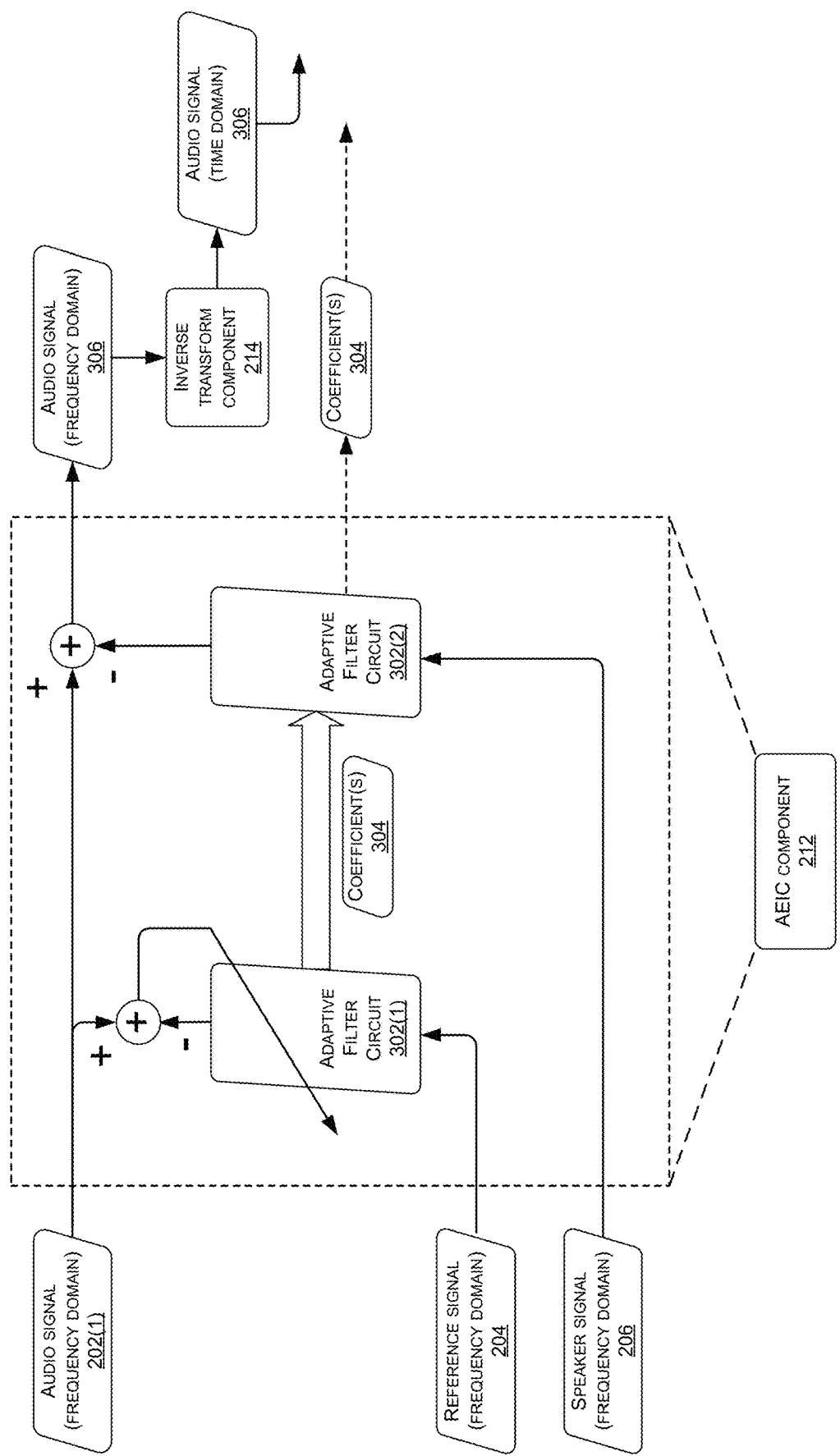
FIG. 3 illustrates an acoustic-echo-and-interference (AEIC) component of the VAD component. The AEIC component may include one or more adaptive filter circuits for, in part, determining one or more filter coefficients for determining a level of acoustic isolation between the inner microphone and the outer microphone of the ear-based device.

FIG. 3 illustrates the AEIC component 212 of the VAD component 200 in further detail. The AEIC component may include one or more adaptive filter circuits for, in part, determining one or more filter coefficients for determining a level of acoustic isolation between the inner microphone and the outer microphone of the ear-based device.

For example, the AEIC component 212 may include a first adaptive filter circuit 302(1) that receives the reference signal 204 (converted into the frequency domain) and the inner audio signal 202(1) (also converted into the frequency domain). The adaptive filter circuit 302(1) may comprise a finite impulse response (FIR) filter configured to perform acoustic echo cancelation (AEC) techniques using the two received audio signals. As is known, the adaptive filter circuit 302(1) may perform iterative AEC techniques before determining one or more filter coefficients 304 of the adaptive filter circuit 302(1).

After determining these coefficients 304, the AEIC component 212 may configure a second adaptive filter circuit 302(2) with the coefficients 304. That is, the AEIC component 212 may affectively copy these coefficients into the second adaptive filter circuit 302(2), which may receive the speaker signal 206 (converted into the frequency domain). The second adaptive filter circuit 302(2) may then output an additional audio signal, which may be subtracted from the inner audio signal 202(1). This subtraction may result in an audio signal 306 corresponding to any portion of the inner audio signal that may be due to a voice of the user. That is, the audio signal 306 may comprise the inner audio signal 202(1) after having largely removed components of the inner audio signal that correspond to audio content being output by the speaker 132, such as primary audio content and any secondary audio content.

As illustrated, this audio signal 306 may then be input to the inverse transform component 214, which may transform the audio signal 306 from the frequency domain into the time domain. In addition, the AEIC component 212 may send the determined coefficients 304 to the voice-detection component 216 for use in determining criteria for detecting a voice of the user, as described below with reference to FIG. 4.

While the above example illustrates a scenario where the reference signal 204 differs from the speaker signal 206 (e.g., because of the inclusion of pass-through content and/or ANC content), in instances where the reference signal 204 and the speaker signal 206 are the same, the techniques may utilize a single adaptive filter circuit, such as the adaptive filter circuit 302(1). In these instances, the reference signal 204 may be input to the adaptive filter circuit 302(1), along with the audio signal 202(1) for determining the filter coefficients of the adaptive filter circuit 302(1) (as in the prior example). Again, these filter coefficients 304 may be sent downstream for determining a level of acoustic seal, which may be used for determining one or more criteria for detecting voice in the audio signal(s). In this example, however, the output of the adaptive filter circuit 302(1) may be the audio signal provided to the inverse transform component 214, after which time the transformed audio signal may be provided to the voice-detection component 216. That is, in instances where the reference signal 204 matches the speaker signal 206, the output of the adaptive filter circuit 302(1) may be subtracted from the audio signal 202(1) to generate the audio signal 306, which may be used by the voice-detection component 216 as described below.

Figure 4:
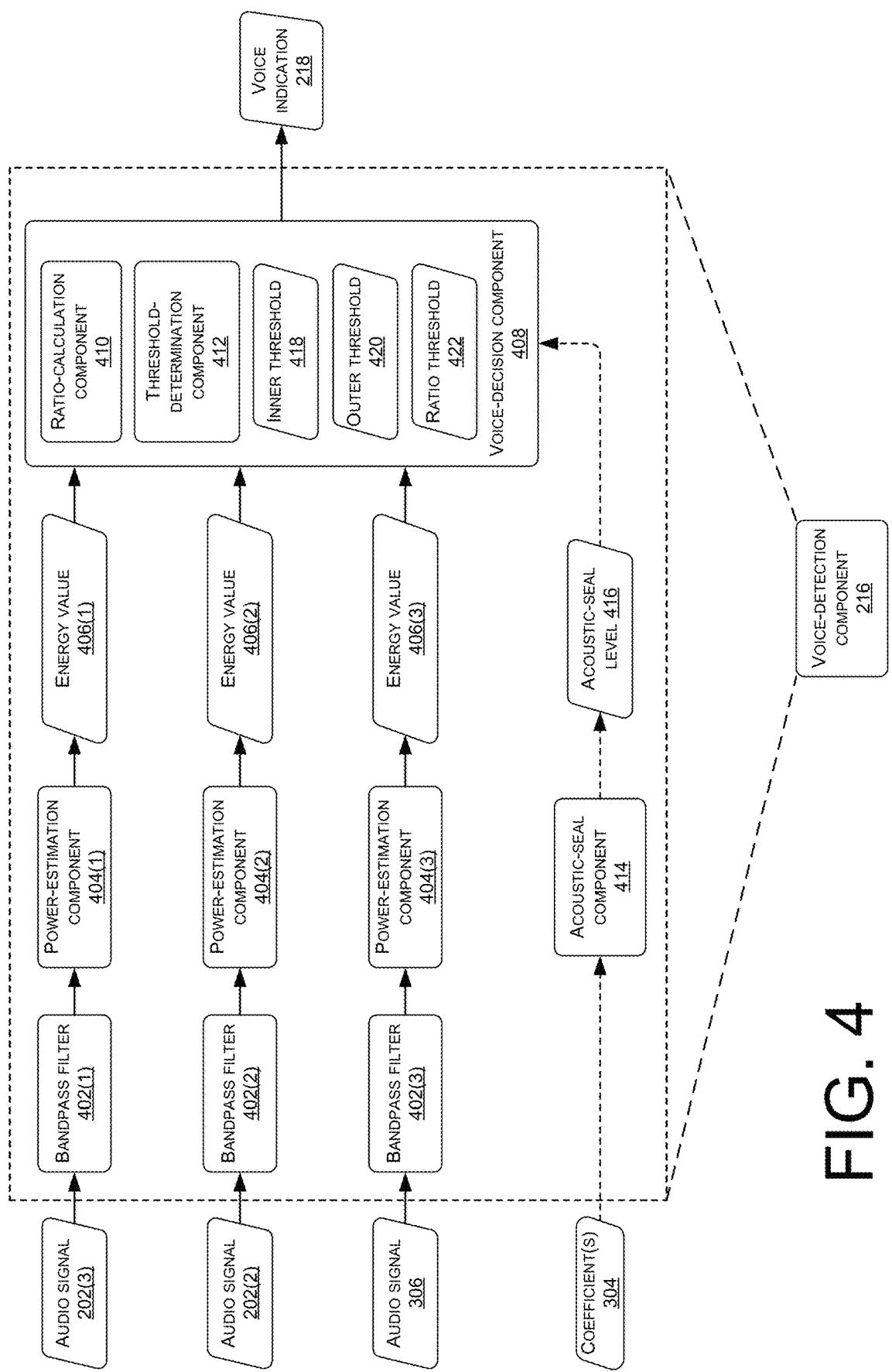
FIG. 4 illustrates a voice-detection component of the VAD component. The voice-detection component may receive the one or more filter coefficients for determining the level of acoustic isolation between the inner and outer microphones, which in turn the voice-detection component may use for setting one or more thresholds for determining whether the audio signals include the voice of the user. The voice-detection component may also generate one or more energy values of audio signals generated by the microphones and may compare these measurements to one or more thresholds for determining whether the audio signals include the voice of the user.

FIG. 4 illustrates the voice-detection component 216 of the VAD component 200 in further detail. The voice-detection component may receive the one or more filter coefficients 304 for determining the level of acoustic isolation between the inner and outer microphones, which in turn the voice-detection component 216 may use for setting one or more thresholds for determining whether the audio signals include the voice of the user. The voice-detection component 216 may also generate one or more energy values of audio signals generated by the microphones and may compare these measurements to one or more thresholds for determining whether the audio signals include the voice of the user, as described immediately below.

As illustrated, the voice-detection component 216 may include a first bandpass filter 402(1) that may receive the audio signal 202(3), a second bandpass filter 402(2) that may receive the audio signal 202(2), and a third bandpass filter 402(3) that may receive the audio signal 306. Each bandpass filter may be configured to output a predefined frequency band of the respective received audio signal. For example, each bandpass filter may output a respective portion of an audio signal corresponding to a frequency range of 80-1500 Hertz. Of course, while an example range is described, it is to be appreciated that each bandpass filter may be configured to allow any other frequency range to pass through.

As illustrated, the passed-through portion of the audio signal 202(3) may be input to a power-estimation component 404(1), the passed-through portion of the audio signal 202(2) may be input to a power-estimation component 404(2), and the passed-through portion of the audio signal 306 may be input to a power-estimation component 404(3). Each of these power-estimation components may output a respective energy value of the corresponding audio signal. For example, the power-estimation component 404(1) may output an energy value 406(1) of the passed-through portion of the audio signal 202(3), the power-estimation component 404(2) may output an energy value 406(2) of the passed-through portion of the audio signal 202(2), and the power-estimation component 404(3) may output an energy value 406(3) of the passed-through portion of the audio signal 306. Each of these energy values may be specified in any type of logarithm unit (e.g., decibels, decibel watts, etc.), as a linear energy value, or any other manner.

Each of the energy values may then be input into a voice-decision component 408 that is configured to analyze one or more of these energy values 406(1)-(3) and determine whether a user's voice is present in one or more of the audio signals generated by the inner and/or outer microphones.

In some instances, however, the voice-decision component 408 may determine one or more criteria for detecting the voice of the user based at least in part on a current sealing condition or level of seal of the ear-based device 106. Thus, and as illustrated, an acoustic-seal component 414 may receive the one or more coefficients 304 described above and may use these coefficients to determine an acoustic-seal level 416. For example, the acoustic-seal component 414 may store a table that associates different coefficients with different sealing indexes, may utilize a function that calculates (using the coefficients as input) a current sealing index, or may otherwise correlate the coefficients 304 to a current sealing condition 416 in any other manner.

After determining the acoustic-seal level 416 based on the one or more filter coefficients 304, the acoustic-seal component 414 may provide data indicative of the this acoustic-seal level 416 to the voice-decision component 408. As described above, given that a level of seal may impact the amount of signal that escapes from an ear canal of the user into an environment of the user, the voice-decision component 408 may utilize the acoustic-seal level 416 for determining the criteria (e.g., threshold(s)) to use to determine whether the generated audio signals include the voice of the user. For example, given that a poor seal will result in more of the inner audio signal escaping to the environment outside the ear canal (and may allow exterior noise to enter the ear canal), the voice-decision component 408 may set a relatively low-threshold between the inner-to-outer energy ratio for determining a voice of the user. Conversely, given that a good seal will effectively isolate the inner microphone from the outer microphones (and thus the resulting energy values), the voice-decision component 408 may utilize a relatively higher threshold between the inner-to-outer energy ratio for detecting the voice of the user.

In more detail, the voice-decision component 408 may include a ratio-calculation component 410, a threshold-determination component 412, an inner threshold 418, an outer threshold 420, and a ratio threshold 422. The ratio-calculation component 410 may calculate a ratio between the energy value 406(3) (corresponding to the audio signal 306) and one of the energy values 406(2) (corresponding to one of the outer audio signals). Thus, this ratio may represent a ratio between a power of the inner audio signal (after removing components of the signal based on content being output by the speaker) and a power of one of the outer audio signals. As will be appreciated, given that the voice of the user travels through the bone and tissue of the user, a relatively high inner-to-outer ratio is indicative of the presence of the voice of the user, while a relatively low ratio is indicative of background noise emanating from sources other than the user.

After calculating the ratio of energy in the inner signal to the outer signal, the voice-decision component 408 may compare this ratio to the ratio threshold 422 for determining whether the voice of the user is present. In addition, the voice-decision component 408 may compare the energy value 406(3) (based on the inner audio signal) to an inner threshold 418 and may compare one or both of the energy values 406(1) and/or 406(2) (based on the outer audio signals, respectively) to an outer threshold 420. In some instances, the voice-decision component 408 may determine that the voice of the user is present if the calculated ratio is greater than the ratio threshold 422, the energy value 406(3) is greater than the inner threshold 418, and/or if the energy value 406(1) (or 406(2)) is greater than the outer threshold 420. Stated otherwise, the voice-decision component 408 may determine that voice is present if there is adequate power in the energy associated with the outer signal and the energy associated with the inner, and if the inner-to-outer power ratio is greater than a threshold (given that this ratio is relatively high for sound emanating from the user as compared to ambient sound).

In some instances, however, the level of acoustic seal of the ear-based device 106 may affect the energy value 406(3) and, thus, ratio calculation. Thus, the threshold-determination component 412 of the voice-decision component 408 may utilize the acoustic-seal level 416 in determining one or both of the inner threshold 418 and the ratio threshold 422. For example, if the level of acoustic seal is relatively low (or poor), then the threshold-determination component 412 may set a relatively lower ratio threshold 422 and a relatively lower inner threshold 418. If, however, the level of acoustic seal is relatively high (or good), then the threshold-determination component 412 may set a relatively higher ratio threshold 422 and a relatively higher inner threshold 418.

After the threshold-determination component 412 sets these thresholds (or other criteria), the voice-decision component 408 may compare the respective values to the respective thresholds. If the criteria are met (e.g., if the inner power, outer power, and ratio are each greater than their respective threshold), then the voice-decision component 408 may output the indication 218 that the user's voice has been detected.

Figure 5A:
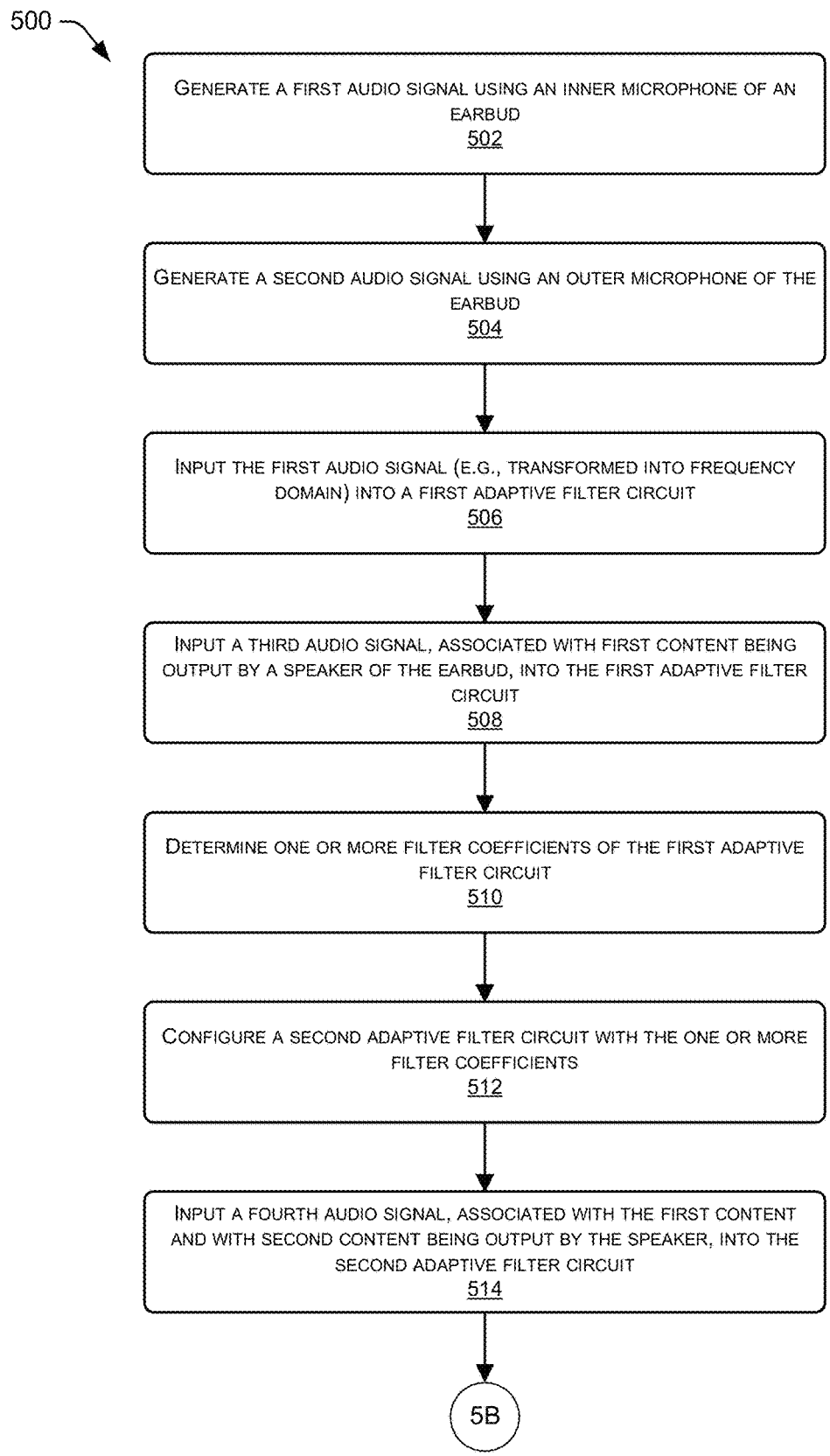
FIGS. 5A-C collectively illustrate a flow diagram of an example process for determining a level of acoustic isolation between an inner microphone and an outer microphone of an ear-based device, setting one or more thresholds, based on the level of acoustic isolation, for determining whether one or more audio signals include a voice of a user wearing the ear-based device, and using the threshold for making the determination.
Figure 5B:
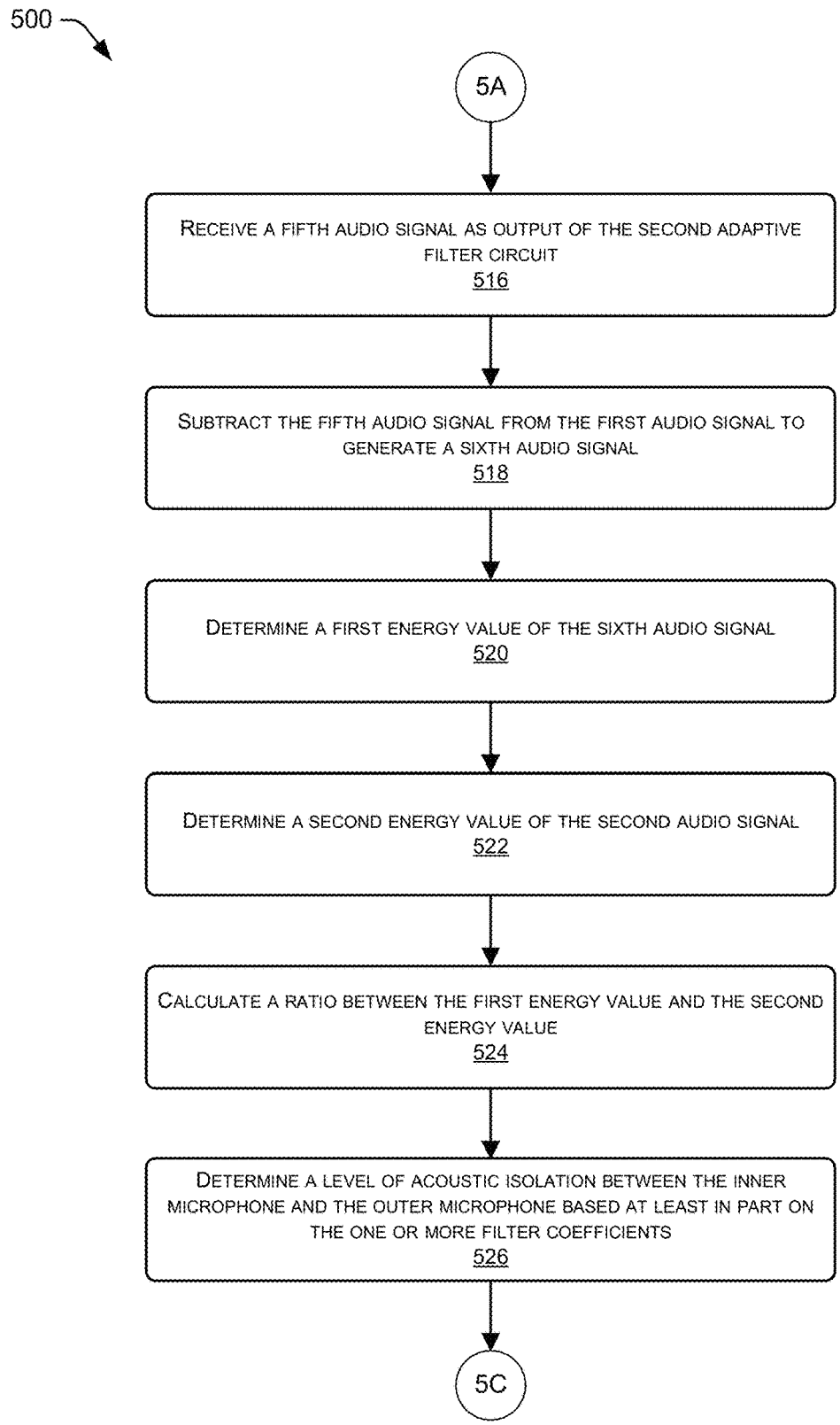
Figure 5C:
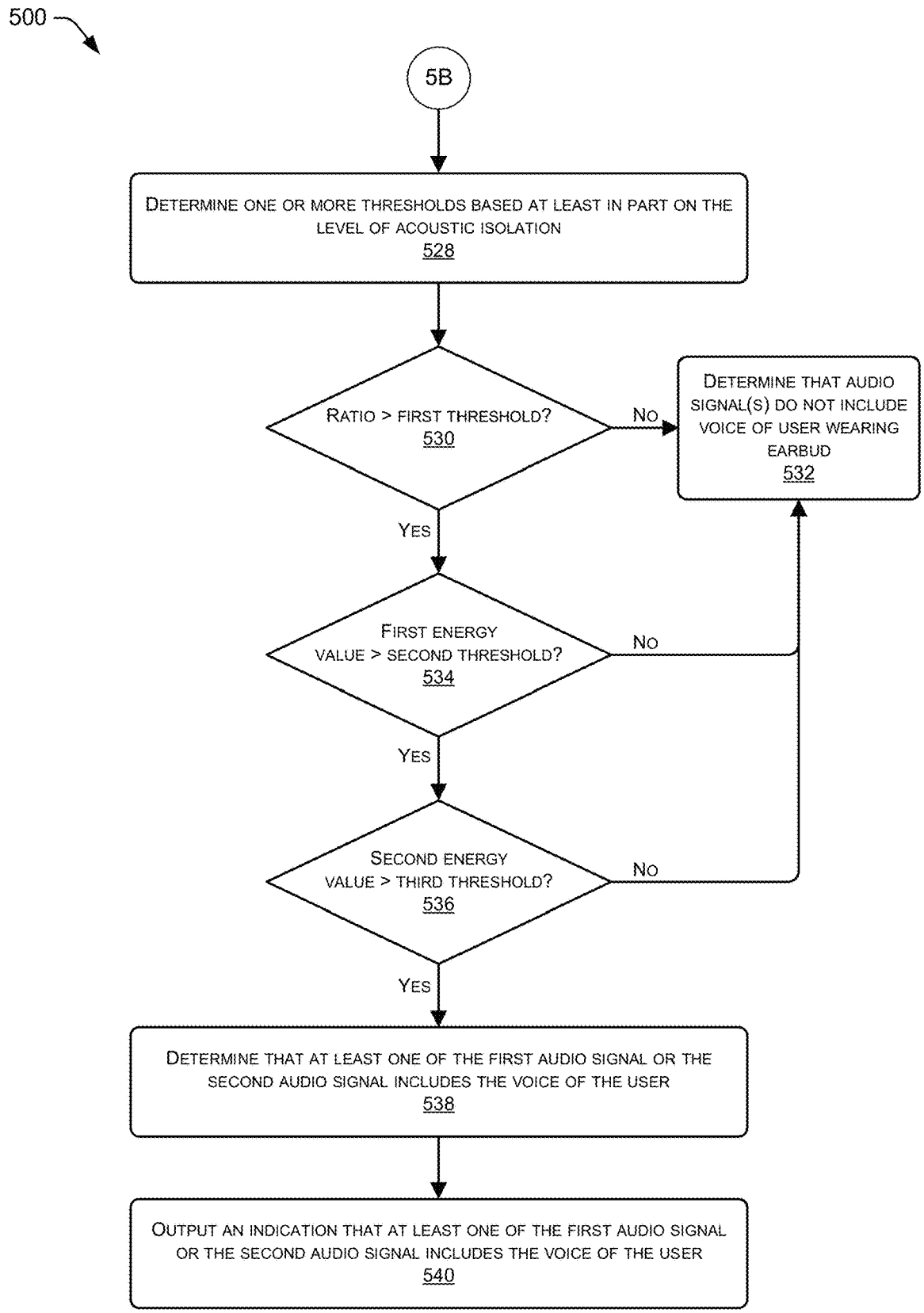

FIGS. 5A-C collectively illustrate a flow diagram of an example process 500 for determining a level of acoustic isolation between an inner microphone and an outer microphone of an ear-based device, setting one or more thresholds, based on the level of acoustic isolation, for determining whether one or more audio signals include a voice of a user wearing the ear-based device, and using the threshold for making the determination. The process 500, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At an operation 502, an inner microphone of an earbud or other ear-based device may generate a first audio signal. As described above, this first audio signal may be based on in-ear sound occurring within an ear canal of a user wearing the earbud.

At an operation 504, an outer microphone of the earbud or other ear-based device may generate a second audio signal. As described above, this second audio signal may be based on exterior sound occurring within an environment of the user wearing the earbud. Further, while this process 500 is described with reference to a signal outer audio signal and a single inner audio signal, it is to be appreciated that other implementations may utilize multiple inner signals and/or multiple outer signals.

At an operation 506, the first audio signal may be input to a first adaptive filter circuit. In some instances, the first audio signal may first be transformed from the time domain into the frequency domain prior to being input into the first adaptive filter circuit. At an operation 508, a third audio signal, associated with content being output by a speaker of the earbud, may be input into the first adaptive filter circuit. In some instances, this third audio signal comprises a reference signal corresponding to primary content being output by the speaker, such as music, a podcast, and/or the like. An operation 510 represents determining one or more filter coefficients of the first adaptive filter circuit. In some instances, this operation comprises utilizing traditional AEC techniques to minimize energy, resulting in the adaptive filter circuit determining the one or more filter coefficients.

At an operation 512, a second adaptive filter circuit is configured with the one or more filter coefficients determined at the operation 510. At an operation 514, a fourth audio signal may be input to the second adaptive filter circuit. In some instances, the fourth audio signal corresponds to a signal being sent to the speaker. This fourth signal may include both the primary content (e.g., the music, podcast, etc.) as well as secondary content being output by the speaker (e.g., pass-through content, ANC content, etc.).

FIG. 5B continues the illustration of the process 500 and includes, at an operation 516, receiving a fifth audio signal as output of the second adaptive filter circuit. This fifth audio signal may correspond to the fourth audio signal as modified by the second adaptive filter circuit that has been configured with the filter coefficients of the first adaptive filter circuit. At an operation 518, this fifth audio signal is subtracted from the first audio signal (which may have been transformed into the frequency domain) to generate a sixth audio signal. The sixth audio signal may correspond to sound in the ear canal of the user wearing the earbud after attempting to remove sound based on content being output by the speaker of the earbud.

At an operation 520, a first energy value of the sixth audio signal is determined. In some instances, this first energy value may correspond to a particular frequency range of the sixth audio signal, such as 80-1500 Hertz. At an operation 522, a second energy value of the second audio signal (generated by the outer microphone) is determined. In some instances, this second energy value may correspond to a particular frequency range of the sixth audio signal, such as 80-1500 Hertz. At an operation 524, a ratio between the first and second energy values is calculated.

At an operation 526, the earbud may determine a level of acoustic isolation between inner microphone and the outer microphone. In some instances, the earbud makes this determination based on the one or more filter coefficients of the first adaptive filter circuit. For example, the earbud may store a data store (e.g., a table) mapping coefficient values to respective acoustic-seal levels and may utilize the filter coefficient as a key for reading the data store, may utilize a function that uses the coefficient values as input for determining acoustic-seal levels, and/or the like.

FIG. 5C continues the illustration of the process 500 and includes, at an operation 528, determining one or more thresholds based at least in part on the determined level of acoustic isolation. For example, the earbud may store a table mapping acoustic-seal levels to respective threshold, may utilize a function that uses the coefficient values as input for determining acoustic-seal levels, and/or the like. In some instances, the earbud may determine a value of a ratio threshold and an inner threshold based on the acoustic-seal level, while the earbud may refrain from using the acoustic-seal level in determining the outer threshold. Further, while the earbud may utilize filter coefficients to determine acoustic-seal levels, and may utilize acoustic-seal levels for determining thresholds (or other criteria for detecting a voice of the user), in other instances, the earbud may user the filter coefficients for directly determining the thresholds (or other criteria).

At an operation 530, the earbud determines whether the ratio calculated at the operation 524 is greater than a first threshold. If not, then at an operation 532 the earbud may determine that the audio signal(s) do not include the voice of the user and may output a corresponding indication. If, however, the earbud determines that this ratio is greater than the first threshold, then at an operation 534 the earbud may determine whether the first energy value determined at the operation 520 is greater than a second threshold. If not, then the process may proceed to the operation 532. If so, however, then at an operation 536 the earbud may determine whether the second energy value determined at the operation 522 is greater than a third threshold. If not, then the process may proceed to the operation 532. If so, however, then the earbud may determine, at an operation 538, that at least one of the first audio signal or the second audio signal includes a voice of the user wearing the earbud. At an operation 540, the earbud may generate and output a corresponding indication, which may result in further processing of the first and/or second audio signals, sending the first and/or second audio signals to another device, and/or the like.

Figure 6:
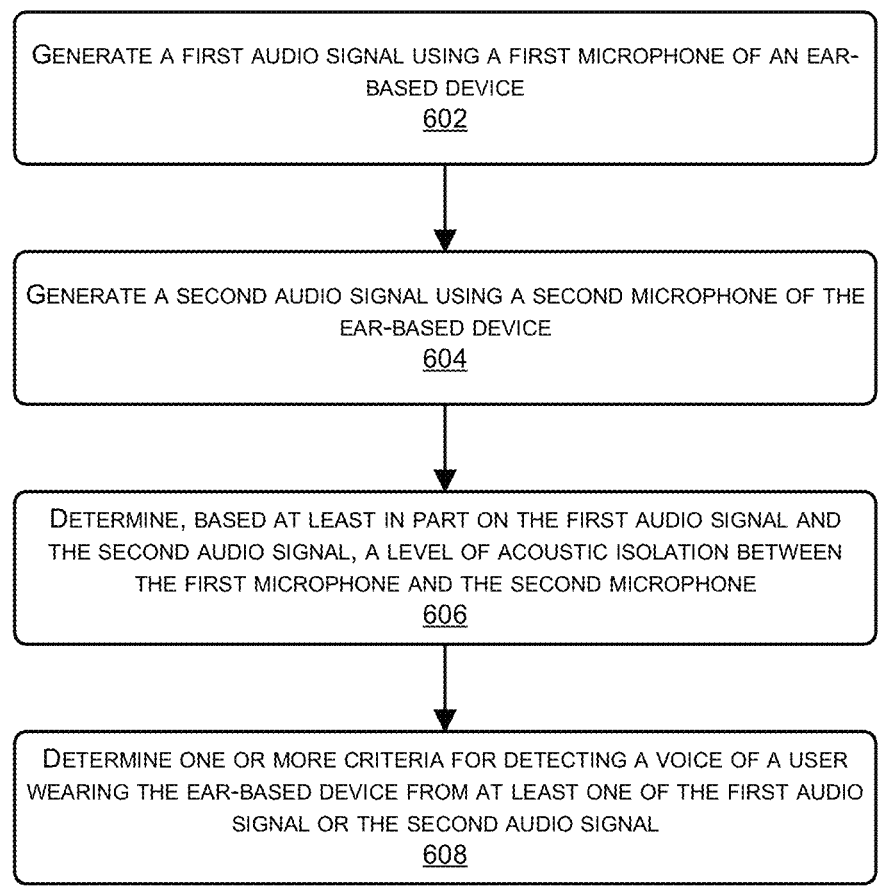
FIG. 6 illustrates a flow diagram of an example process for determining a level of acoustic isolation between a first microphone and a second microphone of an ear-based device, determining one or more criteria for determining whether one or more audio signals include the voice of a user wearing the ear-based device, and using the criteria to make the determination.

FIG. 6 illustrates a flow diagram of an example process 600 for determining a level of acoustic isolation between a first microphone and a second microphone of an ear-based device, determining one or more criteria for determining whether one or more audio signals include the voice of a user wearing the ear-based device, and using the criteria to make the determination.

At an operation 602, a first microphone of an ear-based device generates a first audio signal. At an operation 604, a second microphone of the ear-based device generates a second audio signal. In some instances, the first microphone comprises an inner microphone configured to capture sound in an ear canal of a user wearing the ear-based device, while the second microphone comprises an outer microphone configured to capture sound in an environment of the user.

At an operation 606, the ear-based device or another device may determine, based at least in part on the first audio signal and the second audio signal, a level of acoustic isolation between the first microphone and the second microphone. Finally, at an operation 608, the ear-based device or another device may determine, based at least in part on the level of acoustic isolation, one or more criteria for detecting a voice of the user from at least one of the first audio signal or the second audio signal.

In some instances, the determining of the criteria may comprise determining a threshold. Furthermore, the process 600 may include determining a first signal energy value based at least in part on the first audio signal, determining a second signal energy value based at least in part on the second audio signal, and determining a ratio of the first signal energy value to the second signal energy value. Further, in response to determining that this ratio is greater than the threshold, the process 600 may include outputting an indication that at least one of the first audio signal or the second audio signal includes the voice of the user. Furthermore, in some instances determining the threshold comprises determining a relatively higher threshold for a relatively higher level of acoustic isolation and determining a relatively lower threshold for a relatively lower level of acoustic isolation.

In addition, or in the alternative, to determining that the ratio of the first energy value to the second energy value is greater than a threshold, in some instances the process 600 may include determining that a first signal energy value (corresponding to the first audio signal) is greater than a threshold and/or that the second signal energy value (corresponding to the second audio signal) is greater than a threshold.

As described above with reference to previous figures, the process 600 may further include inputting the first audio signal to an adaptive filter circuit, inputting, to the adaptive filter circuit, a third audio signal associated with audio content being output by a speaker of the ear-based device and determining one or more filter coefficients of the adaptive filter circuit. In these instances, the determining the current level of acoustic isolation comprises determining the current level of acoustic isolation based at least in part on the one or more filter coefficients.

In still other instances, and as described above, the process 600 may include inputting the first audio signal to at a first adaptive filter circuit, inputting, to the first adaptive filter circuit, a third audio signal associated with first audio content being output by a speaker of the ear-based device and determining one or more filter coefficients of the first adaptive filter circuit. Further, a fourth audio signal that is sent to a speaker of the ear-based device may be input to a second adaptive filter circuit that has been configured with the determined one or more filter coefficients. In some instances, the fourth audio signal corresponds to both first content output by the speaker (e.g., primary content such as music) and second content output by the speaker (e.g., secondary content such as pass-through content and/or ANC content). In some instances, the second content represented by the fourth audio signal may include a first component based at least in part on the first audio signal and a second component based at least in part on the second audio signal. For example, the first component may comprise ANC content that is based on the inner microphone signal and the second content may comprise pass-through content based on the outer microphone signal. Further, the process 600 may include receiving a fifth audio signal as output of the second adaptive filter and subtracting the fifth audio signal from the first audio signal to generate a sixth audio signal. In these instances, determining the first energy value associated with the first audio signal comprises determining the first energy value of the sixth audio signal.

Figure 7:
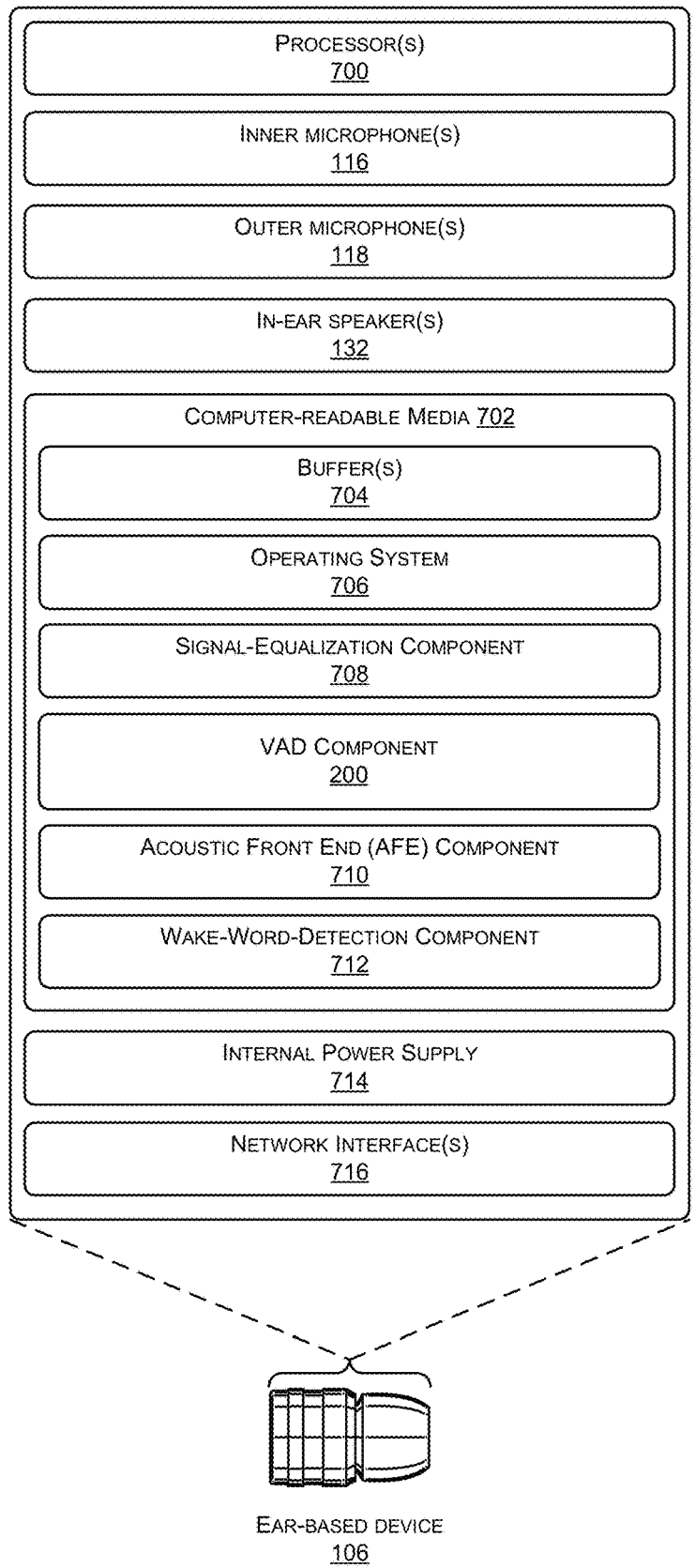
FIG. 7 illustrates a block diagram of an example architecture of an ear-based device that includes components for determining that a user of the ear-based device issued a voice command, and for performing voice-processing techniques on an audio signal representing the voice command.

FIG. 7 illustrates a block diagram of an example architecture of an ear-based device 106 that includes components for determining that a user 104 of the ear-based device 106 issued a voice command 108, and for performing voice-processing techniques on an audio signal representing the voice command 108.

The ear-based device 108 may include any type of in-ear computing device that may be positioned on or around an ear 114 of the user 104, in the ear 114 of the user 104, or otherwise associated with an ear 114 of the user 104. In the illustrated implementation, the ear-based device 106 includes one or more processors 700 configured to power various components of the ear-based device 106. Further, the ear-based device 106 may include various hardware-based components, such as one or more in-ear microphones 116, one or more exterior microphones 118, one or more in-ear speaker(s) 132, one or more acoustic isolation components, and one or more buffers 704.

The in-ear microphone(s) 116 and exterior microphone(s) 118 may function as input devices to receive audio input, such as a voice command 108 from a user 104. The in-ear microphone(s) 116 and exterior microphone(s) 118 may comprise any type of component, such as a transducer, which converts sound into an electrical signal (e.g., audio data). The in-ear microphone(s) 116 may be positioned on or in the ear-based device 106 such that the in-ear microphone(s) 116 are able to detect and capture in-era sound 120 emitting from the ear canal 124 of the user's ear 114. The exterior microphone(s) 118 may be positioned on or in the ear-based device 106 such that the exterior microphone(s) 118 are able to detect and capture exterior sound 122 emitting from an environment 102 surrounding the user 104. The in-ear speaker(s) 132 may function as an output device to output audio sounds corresponding to audio data, which may be stored in the buffer(s) 704 of the ear-based device 106, another memory location, and/or be received from another computing device communicatively coupled to the ear-based device 106. In some examples, the in-ear speaker(s) 132 may emit audible statements to communicate with the user 104, and the user 104 may respond or otherwise issue voice commands 108, which may be captured by the microphone(s) 116 and/or 118. Thus, the in-ear speaker(s) 132 may be used in conjunction with the microphone(s) 116 and/or 118 to facilitate a conversation with the user 104. The in-ear speaker(s) 132 may output various types of audio data, such as audio data from a phone call (e.g., a phone call conducted through the user device 150 and communicated to the ear-based device 106 using a wireless network), music audio data, or any other type of audio data.

The ear-based device 106 may further include the buffer(s) 704 for storing, at least temporarily, various types of data. For instance, if the ear-based device 106 is outputting audio data using the in-ear speaker(s) 132, the buffer(s) 704 may store portions of the audio data prior to outputting the audio data. By storing audio data in the buffer(s) 704, the ear-based device 106 may perform various types of noise-cancellation techniques. As another example, the buffer(s) 704 may store exterior audio data generated the exterior microphone(s) 118 that represents the exterior sound 122. The exterior audio data may be used for various purposes, such as for performing active acoustic isolation to reduce the amount of exterior sound 122 that reaches the in-ear microphones(s) 116. For instance, acoustic isolation component(s) may identify a waveform from the exterior audio data store in the buffer(s) 704 that represents ambient noise from the environment 102 of the user 104, or other unwanted noise, generate a waveform configured to cancel out or attenuate the ambient noise, and cause the in-ear speaker(s) 132 (and/or other speakers on the ear-based device 106 not illustrated) to output sound corresponding to the waveform to perform active acoustic isolation. In some examples, the acoustic isolation component(s) may comprise a material (e.g., foam) that may, at least partially, acoustically isolate the in-ear microphone(s) 116 from the exterior microphone(s) 118.

The ear-based device 106 may further include computer-readable media 702 which stores various software components, firmware components, or combinations thereof. The components stored in the computer-readable media 702 may comprise computer-readable instructions (e.g., software, firmware, a combination thereof, etc.) which configured the processor(s) 700 to perform various operations. The computer-readable media 702 may store an operating system 706 configured to manage hardware, software, firmware, and/or other systems and services within and coupled to the ear-based device 106. The computer-readable media 702 may additionally store one or more applications, such as music playing applications, telephone call conducting applications, or any other type of applications appropriate for an ear-based device 106. The applications may be configured to play songs or other audio data/files by causing the processor(s) 700 to output audio data using the in-ear speaker(s) 132.

The computer-readable media 702 may include a signal-equalization component 708 that, when executed by the processor(s) 700, may perform various types of equalization techniques on the audio signals generated by the in-ear microphone(s) 116 and/or the exterior microphone(s) 118. To perform the equalization techniques, the signal-equalization component 708 may include or utilize components such as one or more filters (e.g., low-pass filter, high-pass filter, band-pass filter, etc.) to attenuate frequencies, one or more frequency amplifiers (e.g., operation amplifiers) to boost/amplify frequencies, and/or any other type of equalization processing techniques. In some examples, the signal-equalization component 708 may equalize one or both of the exterior audio signal and inner audio signal. For example, the exterior sound 122 captured by the exterior microphone(s) 118 may include ambient noise from the environment of the user 104, a frequency response caused by the auricle 130 of the user's ear 114 (e.g., a head-related transfer function (HRTF) response), high amplitude peaks, and other types of undesirable attributes. In such examples, the signal-equalization component 708 may include or utilize various components to, for example, attenuate a portion of the exterior audio signal, filter out a portion of the exterior audio signal, and other types of equalization techniques. Additionally, the signal-equalization component 708 may perform equalization techniques on the inner audio signal. The inner audio signal may represent the in-ear sound 120 that is transmitted through the inner-ear 114 of the user 104 and out the ear canal 124 and may be affected by bone of the inner-ear, tissue of the inner-ear, etc., though which the sound passes. For instance, sound 120 from the user 104 that emits from the user's ear canal 124 may have a lower resonance based on the length of the user's ear canal 124, a fall-off at higher frequencies, and/or lack amplitude peaks when compared to sound that comes from the user's 104 mouth. In light of this, the signal-equalization component 708 may perform equalization techniques on the inner audio signal, such as attenuating/modifying a portion of the inner audio signal, filtering out a portion of the inner audio signal, etc. Accordingly, the signal-equalization component 708 may perform equalization techniques on one or both of the inner audio signal and the outer audio signal such that the two audio signals are in a same, or similar, bandwidth, which may help identify correlations between the two signals.

The computer-readable media 702 may further include a voice activity detection (VAD) component 200 to perform the VAD techniques described above. The VAD component 312 may utilize one or more VAD algorithms based on channel energy with long and short term energies, sub-band long and short term energies with combination logic, Deep Neural Network (DNN) based VADs, or any other type of VAD algorithms.

The computer-readable media 702 may further include an acoustic front end (AFE) component 710 to perform various acoustic-processing techniques on the audio signals, such as beamforming, noise-cancellation, echo cancellation, and so forth. Details regarding some examples of the audio signal processing performed by the AFE component 710 are described in detail with reference to FIG. 4. Further, the computer-readable media 702 may include a wake-word-detection component 712 to detect, in one or more of the exterior audio signal, the inner audio signal, and/or the correlated audio signal, a wake word or keyword.

The ear-based device may be powered, at least partially, be an internal power supply 714. For instance, the ear-based device 106 may include one or more of batteries, battery banks, supercapacitors, rechargeable batteries, or any other type of internal power supply which may be charged using mains-power and provide power to the ear-based device 106.

The ear-based device 106 may further include one or more network interfaces 716 that may be utilized by the ear-based device 106 to communicate with other devices over networks, such as the network(s) 134. Generally, the network interface(s) 716 enable the ear-based device 106 to communicate over any type of network, such as a wired network (e.g., USB, Auxiliary, cable etc.), as well as wireless networks (e.g., WiFi, Bluetooth, Personal Area Networks, Wide Area Networks, and so forth). In some examples, the network interface(s) 716 may include a wireless unit coupled to an antenna to facilitate wireless connection to a network. However, the network interface(s) may include any type of component (e.g., hardware, software, firmware, etc.) usable by the ear-based device 106 to communicate over any type of wired or wireless network. The network interface(s) 716 may enable the ear-based device 106 to communicate over networks such as a wireless or Wi-Fi network communications interface, an Ethernet communications interface, a cellular network communications interface, a Bluetooth communications interface, etc., for communications over various types of networks 134, including wide-area network, local-area networks, private networks, public networks etc. In the case of a wireless communications interfaces, such network interface(s) 716 may include radio transceivers and associated control circuits and logic for implementing appropriate communication protocols.

In some implementations, the processors(s) 140 and 700 may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) 140 and 700 may possess its own local memory, which also may store program modules, program data, and/or one or more operating systems. The processors(s) 140 and 700 may be located in a single device or system, or across disparate devices or systems, which may be owned or operated by various entities.

The computer-readable media 142 and 702 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 142 and 702 may be implemented as computer-readable storage media ("CRSM"), which may be any available physical media accessible by the processor(s) 140 and/or 300 to execute instructions stored on the memory 142 and 702. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s) 140 and 300.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An earbud configured to be worn by a user, the earbud comprising:
an inner microphone configured to generate an inner audio signal based on first sound within an ear canal of the user;
an outer microphone configured to generate an outer audio signal based on second sound from an ambient environment of the user;
one or more processors; and
one or more computer-readable media storing computer-executable instructions that, when executed, cause the one or more processors to perform acts comprising:
determining a first energy value associated with the inner audio signal;
determining a second energy value associated with the outer audio signal;
calculating a ratio between the first energy value and the second energy value;
determining a value of a current level of acoustic isolation between the inner microphone and the outer microphone;
using the value of the current level of acoustic isolation between the inner microphone and the outer microphone to set a threshold for use in detecting a presence of a voice of the user;
determining that the ratio is greater than threshold; and
outputting an indication that at least one of the inner audio signal or the outer audio signal includes voice of the user.

2. The earbud as recited in claim 1, further comprising a speaker and an adaptive filter circuit, and wherein the one or more computer-readable media further store computer-executable instructions that, when executed, cause the one or more processors to perform acts comprising:
receiving, by the adaptive filter circuit, the inner audio signal;
receiving, by the adaptive filter circuit, a reference audio signal associated with audio content being output by the speaker of the earbud; and
receiving one or more filter coefficients as output of the adaptive filter circuit;
and wherein the determining the value of the current level of acoustic isolation comprises accessing a data store that stores respective filter coefficients to respective levels of acoustic isolation and using the one or more filter coefficients for determining the current level of acoustic isolation.

3. A method implemented at least in part by an ear-based device worn by a user, the method comprising:
generating a first audio signal using a first microphone of the ear-based device;
generating a second audio signal using a second microphone of the ear-based device;
determining, based at least in part on the first audio signal and the second audio signal, a level of acoustic isolation between the first microphone and the second microphone; and
determining, based at least in part on the level of acoustic isolation, one or more criteria for detecting a voice of the user from at least one of the first audio signal or the second audio signal.

4. The method as recited in claim 3, wherein determining the one or more criteria comprises determining a threshold that is based at least in part on the level of acoustic isolation, the method further comprising:
determining a first signal energy value based at least in part on the first audio signal;
determining a second signal energy value based at least in part on the second audio signal;
determining a ratio of the first signal energy value to the second signal energy value;
determining that the ratio is greater than the threshold; and
outputting an indication that at least one of the first audio signal or the second audio signal includes the voice of the user.

5. The method as recited in claim 3, further comprising:
receiving, by an adaptive filter circuit, the first audio signal;
receiving, by the adaptive filter circuit, a third audio signal associated with audio content being output by a speaker of the ear-based device; and
receiving, as output of the adaptive filter circuit, one or more filter coefficients;
and wherein the determining the current level of acoustic isolation comprises determining the current level of acoustic isolation based at least in part on the one or more filter coefficients.

6. The method as recited in claim 3, further comprising:
receiving, at an adaptive filter circuit, the first audio signal;
receiving, by the adaptive filter circuit, a third audio signal associated with audio content being output by a speaker of the ear-based device; and
receiving, as output of the adaptive filter circuit, one or more filter coefficients;
receiving, as output of the adaptive filter circuit, a fourth audio signal; and
subtracting the fourth audio signal from the first audio signal to generate a fifth audio signal;
wherein determining the first energy value comprises determining energy value of the fifth audio signal;
and wherein the determining the current level of acoustic isolation comprises determining the current level of acoustic isolation based at least in part on the one or more filter coefficients.

7. The method as recited in claim 3, further comprising:
receiving, by a first adaptive filter circuit of the ear-based device, the first audio signal;
receiving, by the first adaptive filter circuit, a third audio signal associated with first audio content being output by a speaker of the ear-based device;
determining one or more filter coefficients of the first adaptive filter circuit;
receiving, by a second adaptive filter circuit of the ear-based device, a fourth audio signal, the fourth audio signal including the first audio content and second audio content, wherein the second audio content is based on at least one of the first audio signal or the second audio signal;
receiving, as output of the second adaptive filter circuit, a fifth audio signal; and
subtracting the fifth audio signal from the first audio signal to generate a sixth audio signal;
and wherein determining the first energy value comprises determining energy value of the sixth audio signal.

8. The method as recited in claim 7, wherein the second audio content includes a first component based at least in part on the first audio signal and a second component based at least in part on the second audio signal.

9. The method as recited in claim 3, wherein determining the one or more criteria comprises determining a threshold that is based at least in part on the level of acoustic isolation, the method further comprising:
  determining a first signal energy value based at least in part on the first audio signal;
  determining that the first signal energy value is greater than the threshold; and
  outputting an indication that at least one of the first audio signal or the second audio signal includes voice of the user.

10. The method as recited in claim 3, wherein determining the one or more criteria comprises determining a threshold, and the method further comprising:
  determining an energy value based at least in part on the second audio signal; and
  determining that the energy value is greater than the threshold.

11. The method as recited in claim 3, wherein:
  generating the first audio signal comprises generating the first audio signal using a first microphone configured to capture sound in an ear canal of the user; and
  generating the second audio signal comprises generating the second audio signal using a second microphone configured to capture sound in an ambient environment of the user.

12. An ear-based device configured to be worn by a user, the ear-based device comprising:
  a first sensor;
  a second sensor;
  one or more processors; and
  one or more computer-readable media storing computer-executable instructions that, when executed, cause the one or more processors to perform acts comprising:
    generating a first audio signal using the first sensor;
    generating a second audio signal using the second sensor;
    determining, based at least in part on the first audio signal and the second audio signal, a level of acoustic isolation between the first sensor and the second sensor; and
    determining, based at least in part on the level of acoustic isolation, one or more criteria for detecting a voice of the user from at least one of the first audio signal or the second audio signal.

13. The ear-based device as recited in claim 12, wherein the determining the one or more criteria comprises determining a threshold that is based at least in part on the level of acoustic isolation, and wherein the one or more computer-readable media further store computer-executable instructions that, when executed, cause the one or more processors to perform acts comprising:
  determining a first signal energy value based at least in part on the first audio signal;
  determining a second signal energy value based at least in part on the second audio signal;
  determining a ratio of the first signal energy value to the second signal energy value;
  determining that the ratio is greater than the threshold; and
  outputting an indication that at least one of the first audio signal or the second audio signal includes the voice of the user.

14. The ear-based device as recited in claim 12, further comprising a speaker, and wherein the one or more computer-readable media further store computer-executable instructions that, when executed, cause the one or more processors to perform acts comprising:
  receiving, by an adaptive filter circuit, the first audio signal;
  receiving, by the adaptive filter circuit, a third audio signal associated with audio content being output by the speaker; and
  receiving, as output of the adaptive filter circuit, one or more filter coefficients;
  and wherein the determining the current level of acoustic isolation comprises determining the current level of acoustic isolation based at least in part on the one or more filter coefficients.

15. The ear-based device as recited in claim 12, further comprising a speaker, and wherein the one or more computer-readable media further store computer-executable instructions that, when executed, cause the one or more processors to perform acts comprising:
  receiving, at an adaptive filter circuit, the first audio signal;
  receiving, by the adaptive filter circuit, a third audio signal associated with audio content being output by a speaker of the ear-based device; and
  receiving, as output of the adaptive filter circuit, one or more filter coefficients;
  receiving, as output of the adaptive filter circuit, a fourth audio signal; and
  subtracting the fourth audio signal from the first audio signal to generate a fifth audio signal;
  wherein determining the first energy value comprises determining energy value of the fifth audio signal;
  and wherein the determining the current level of acoustic isolation comprises determining the current level of acoustic isolation based at least in part on the one or more filter coefficients.

16. The ear-based device as recited in claim 12, further comprising a speaker, a first adaptive filter circuit, and a second adaptive circuit, and wherein the one or more computer-readable media further store computer-executable instructions that, when executed, cause the one or more processors to perform acts comprising:
  receiving, by the first adaptive filter circuit, the first audio signal;
  receiving, by the first adaptive filter circuit, a third audio signal associated with first audio content being output by the speaker;
  determining one or more filter coefficients of the first adaptive filter circuit;
  receiving, by the second adaptive filter circuit configured with the one or more filter coefficients, a fourth audio signal sent to the speaker, the fourth audio signal including the first audio content and second audio content, wherein the second audio content is based on at least one of the first audio signal or the second audio signal;
  receiving, as output of the second adaptive filter circuit, a fifth audio signal; and
  subtracting the fifth audio signal from the first audio signal to generate a sixth audio signal;
  and wherein the determining the first energy value associated with the first audio signal comprises determining the first energy value of the sixth audio signal.

17. The ear-based device as recited in claim 16, wherein the second audio content includes a first component based at least in part on the first audio signal and a second component based at least in part on the second audio signal.

18. The ear-based device as recited in claim 12, wherein the determining the one or more criteria comprises determining a threshold that is based at least in part on the level of acoustic isolation, and wherein the one or more computer-readable media further store computer-executable instructions that, when executed, cause the one or more processors to perform acts comprising:
   determining a first signal energy value based at least in part on the first audio signal;
   determining that the first signal energy value is greater than the threshold; and
   outputting an indication that at least one of the first audio signal or the second audio signal includes the voice of the user.

19. The ear-based device as recited in claim 12, wherein:
   the first sensor comprises an inner sensor configured to capture sound in an ear canal of the user; and
   the second sensor comprises an outer sensor configured to capture sound in an ambient environment of the user.

20. The ear-based device as recited in claim 12, wherein:
   the first sensor comprises at least one of a first microphone or a first accelerometer; and
   the second sensor comprises at least one of a second microphone or a second accelerometer.

* * * * *